US009602560B1

United States Patent
Moody et al.

(10) Patent No.: US 9,602,560 B1
(45) Date of Patent: Mar. 21, 2017

(54) CONCURRENT DISPLAY OF MASKED VIEWS OF APPLICATIONS BETWEEN DEVICES

(71) Applicant: United Services Automobile Association (USAA), San Antonio, TX (US)

(72) Inventors: Mark W. Moody, San Antonio, TX (US); Guy Langley, San Antonio, TX (US); Shawntá Swindell, Newport News, VA (US); Elizabeth Halle, Boerne, TX (US); Gina R. Smith, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 61 days.

(21) Appl. No.: 14/102,169

(22) Filed: Dec. 10, 2013

(51) Int. Cl.
*G06F 3/00* (2006.01)
*H04L 29/06* (2006.01)

(52) U.S. Cl.
CPC .................................. *H04L 65/403* (2013.01)

(58) Field of Classification Search
CPC .......................... G06F 21/6254; H04L 65/403
See application file for complete search history.

(56) References Cited

U.S. PATENT DOCUMENTS

| 7,870,193 | B2* | 1/2011 | Hintermeister et al. ...... 709/204 |
| 8,239,773 | B1* | 8/2012 | Billman ............ G06F 17/30861 715/751 |
| 9,037,537 | B2* | 5/2015 | DeRoller ...................... 707/608 |
| 2004/0255116 | A1* | 12/2004 | Hane et al. .................... 713/161 |
| 2011/0247081 | A1* | 10/2011 | Shelton ........................... 726/28 |
| 2012/0036452 | A1* | 2/2012 | Coleman ................. G06F 21/55 715/751 |
| 2012/0284635 | A1* | 11/2012 | Sitrick et al. ................. 715/751 |
| 2013/0061335 | A1* | 3/2013 | Schwabe ......................... 726/28 |
| 2014/0082523 | A1* | 3/2014 | Duquene ........... G06F 17/30165 715/753 |
| 2015/0019999 | A1* | 1/2015 | Page ............................ 715/753 |

* cited by examiner

*Primary Examiner* — Omar Abdul-Ali
(74) *Attorney, Agent, or Firm* — Fish & Richardson P.C.

(57) ABSTRACT

Methods, systems, and computer-readable and executable instructions for concurrent display of a masked view of an application between devices are described herein. One method for concurrent display of a masked view of an application between devices includes establishing a collaborative session with a first computing device and a second computing device, replicating a masked view of a first application on the first computing device, and concurrently displaying a view of the first application on a first user interface of the first computing device and the masked view of the first application on a second user interface of the second computing device in the collaborative session.

19 Claims, 4 Drawing Sheets

CONCURRENT DISPLAY OF MASKED VIEWS OF APPLICATIONS BETWEEN DEVICES

TECHNICAL FIELD

The present disclosure relates to methods, systems, and computer-readable and executable instructions for concurrent display of masked views of applications between devices.

BACKGROUND

The increasing capabilities of computing devices, such as wireless access to the Internet, have provided access to information into the mainstream of everyday life. In many situations, a computing device can have applications pre-installed on the device and/or downloaded to the device. An application can, for example, include computer software (e.g., instructions) developed for a computing device to assist a user in performing a particular task.

DETAILED DESCRIPTION

The present disclosure provides methods, systems, and computer-readable and executable instructions for concurrent display of masked views of applications between devices. For example, concurrent display of a masked view of an application between a first computing device and a second computing device can include displaying a view of an application on a mobile device and a stationary device using a wireless and/or physical network communication.

Applications on computing devices, such as a mobile device and/or a stationary device, can assist a user of the device in performing a particular task. A mobile device, as used herein, can include a mobile cellular telephone, a tablet, a mobile personal computer, and a personal digital assistant (PDA), among other mobile devices. A stationary device can include, for instance, a desktop computer, and/or a laptop computer (e.g., that is generally not moved when used), among other stationary devices. The applications can include user interfaces for a user to interact with the application on the computing device. For instance, applications can be used to check a weather forecast, conduct financial transactions, and make a purchase, among many other tasks. As another example, an application can be used for reviewing options for products (e.g., estimates for insurance premiums, options and/or estimates for financial products, etc.)

A user interface can, for example, include a space where interactions between a user and a computing device occur (e.g., allows a user to interact with a computing device using images, text, voice, and/or video). A user interface can include hardware components and computer instruction components. For instance, hardware components can include input components (e.g., a mouse, a touch screen, and a keyboard) and output components for the computing device to indicate the effects of user input (e.g., display). An example user interface can include a graphical user interface (GUI). A GUI can, for example, represent actions and tasks available to a user through graphical icons and visual indicators.

In some instances, a customer may contact an entity for a service, product, information, and/or assistance, among others purposes and/or reasons. The customer may be directed to a customer service representative (CSR). A CSR can include a representative of the entity, for instance. The CSR may utilize an application on a computing device to determine an answer to the customer's question.

In many instances, it may be difficult to explain the answer to the customer's question using spoken words. For example, an answer to a customer's question can include a variety of different options. As an example, a customer may contact an entity to receive an automobile insurance quote. A CSR may utilize an application on a computing device to determine a number of automobile insurance options for the customer. The options can include a variety of features, prices, coverage, and/or bundling with other products and/or services, among other options.

In such instances, it may be beneficial to provide a view of the application to the user to assist in explaining the answer. However, an application that the CSR is viewing may contain sensitive information to the entity, information that may be embarrassing to the customer, and/or information that may not be disclosed to the customer for legal and/or other reasons, among other information.

In contrast, concurrent display of a masked view of application between devices, in accordance with some embodiments of the present disclosure, can allow an entity to display an application of the entity to customers while not disclosing particular information. A masked view of an application, as used herein, can include a screen shot, an editable document, and/or an editable screen shot created with removal and/or replacement of portions of the view of the application. For example, the removal can include restriction and/or limitation of information displayed on a view of an application. In some embodiments, the information displayed can be restricted to information associated with a customer (e.g., as discussed further herein). That is, at least a portion (e.g., data) of the view of the application can be removed and/or replaced so that sensitive, embarrassing, and/or information that may be illegal to display is not displayed to a customer.

The customer and the CSR can, in some embodiments, be in a collaborative session. A collaborative session, as used herein, can include a connection between two or more devices allowing concurrent display of information. For example, a collaborative session can include a concurrent display of information within a browsing and/or application session of the customer's device, concurrent display of information within a browsing and/or application session of a CSR's device, and/or concurrent navigation through a browser and/or application. The customer and the CSR can establish the collaborative session, for instance, utilizing a portal and/or collaboration framework.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. As used herein, "a" or "a number of" something can refer to one or more such things. For example, "a number of objects" can refer to one or more objects.

Figure 1:
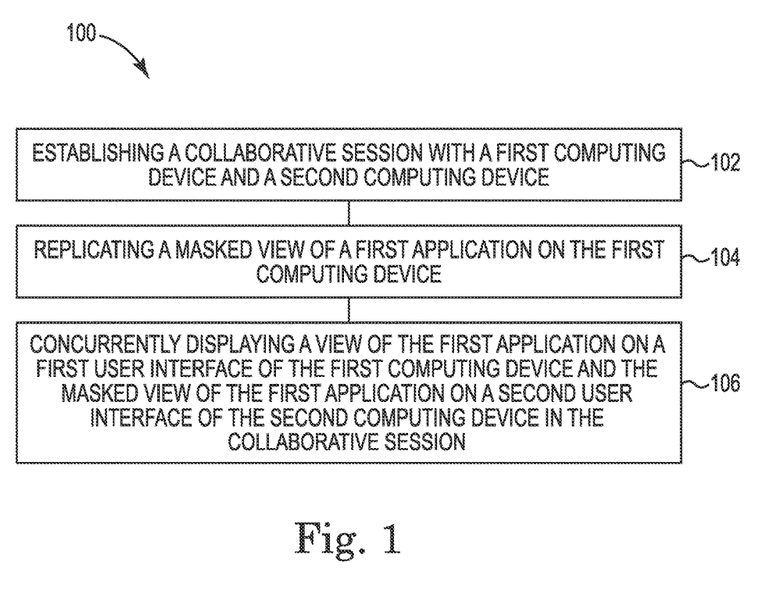
FIG. 1 illustrates a block diagram of an example method for concurrent display of a masked view of an application between devices according to one or more embodiments of the present disclosure.

FIG. 1 illustrates a block diagram of an example method 100 for concurrent display of a masked view of an application between devices according to one or more embodiments of the present disclosure.

At block 102, the method 100 can include establishing a collaborative session with a first computing device and a second computing device. A collaborative session can, for example, include a connection between two or more devices allowing concurrent display between the two or more devices.

A first computing device, as used herein, can include an entity computing device (e.g., owned by an entity and/or used by an employee of an entity). For instance, a CSR may use an entity computing device.

A second computing device can include a user computing device (e.g., owned and/or used by a user). A user, as used herein, can include a customer and/or other person communicating with an entity.

For example, the first computing device and/or the second computing device can include a mobile device and/or a stationary device. A computing device, as used herein, can include any device with a display that can connect to the Internet. For instance, a mobile device can include a mobile cellular telephone, a tablet personal computer, a mobile personal computer, and/or a personal digital assistant (PDA), among other mobile devices. A stationary device can include a computing device that is not mobile and/or is capable of being mobile but is used and/or operated in a stationary location. For example, a stationary device can include a desktop computer. In some instances, the second computing device can include a television (e.g., a television with wireless and/or wired communication and/or capable of connecting to the Internet).

At block 104, the method 100 can include replicating a masked view of a first application on the first computing device. A first application can include a native application to the first computing device and/or a web application, for example. A native application, as used herein, can include an application designed, developed, and/or created for use on a specific computing environment (e.g., computer language and/or operating system). The native application can be pre-installed on the first computing device and/or downloaded to the first computing device, for instance. A web application can, for instance, include an application that uses a web browser as a client.

In some embodiments, the first computing device can include a number of native applications and/or web applications. One or more of the native applications and/or web applications can be running (e.g., operating) on the first computing device at a particular period of time. For example, a CSR may be using multiple applications at a particular time on the first computing device.

The masked view of the first application can include a view of the application with at least a portion of the view masked (e.g., limited, restricted, removed, replaced, and/or otherwise hidden). The portion of the view masked can, for instance, include sections of the view of the first application, particular data and/or information, and/or pictures, among other portions. In some instances, the masked view can include and/or be a video. The video may assist the user of the second computing device, for example.

In a number of embodiments, the masked view can include limitation and/or restriction of information on a user interface of the first application based on the identification of the user of the second computing device (e.g., a customer). For instance, each customer of an entity may have a unique identifier (e.g., customer identification, customer number, etc.) A user of the first computing device may have a plurality of applications displayed and/or each application can have information displayed that may be associated with a plurality of customers. The masked view can, for instance, be replicated that includes information that is associated with the unique identifier of the user of the second computing device. In such embodiments, information of the application and/or user interface can be configured to be associated with the unique identifier of the user of the second computing device (e.g., a particular customer) that the information is associated with (e.g., about).

Applications that display information associated with a plurality of customers can, for example, be embedded with tags that associate particular information of the displayed application with each of the plurality of customers. In such instances, a masked view can be created for each of the plurality of customers. Each masked view can display information associated with the particular customer that is in an established collaborative session with the first computing device and can mask information associated with the remaining plurality of customers.

The masked view of the first application can include, for instance, a screen shot of the view of the first application, editable document of the screen shot of the view of the first application, and/or an editable screen shot of the first application. An editable document can, for instance, be edited by the user and/or CSR within the collaborative session.

Such editing can include, for example, a revised concurrent display of the first application (e.g., as discussed further herein). That is, the view of the first application that is displayed may not be a static but rather a document and/or screen shot with functional capabilities (e.g., portions can be edited, changed, revised, removed, etc.). A user of the first computing device can revise the view of the first application and the user of the second computing device can concurrently see the revised view (e.g., an interactive experience).

As an example, a CSR on an entity computing device (e.g., a first computing device) can interact with a customer on a user computing device (e.g., a second computing device) by controlling a revised view of a calculation. For instance, the revised view of the calculation can include a live calculator experience.

The CSR may, for instance, be explaining different investment (e.g., financial investment) options for the customer. The live calculator experience can include a revised view of different investment options including features, benefits, costs, etc. The revised view can include a savable document that the CSR and/or the customer can save throughout the experience. In this manner, the CSR and/or customer can keep a record of the discussion.

In accordance with some embodiments of the present disclosure, an electronic signature can be sent from the second computing device. For instance, the first computing device can receive the electronic signature associated with the masked view of the first application on the second user interface of the second computing device in the collaborative session. The masked view of the first application, in such instances, can include a view of a disclosure and/or an agreement that may require a signature from a customer to purchase a product, service, and/or other agreement with the entity.

In various embodiments, the method 100 can include configuring a number of portions of the first application that are un-sharable and/or sharable. Portions of the first application that are un-sharable can include portions of the first application to be masked when a customer is sent a view of the first application. Portions of the first application that are sharable can include portions of the first application a customer is sent when a view of the first application is sent. The portions of an application can include sections, data, information, pictures, etc., displayed on a user interface of the application. For instance, the masked view of the first application can be replicated by automatically limiting, restricting, removing, replacing, and/or hiding portions of the view of the first application that are not defined as sharable and/or portions of the view of the first document that are defined as un-sharable.

The configuring can include, for instance, tagging the portions of the application and/or user interface associated with the application. For example, an administrator and/or developer associated with the entity can tag a start of a section of a screen that is sharable and/or un-sharable and an end of the section of the screen that is sharable and/or un-sharable, respectively. Based on the tagging, portions of the screen can be masked and/or portions of the application and/or user interface can be shared.

At block 106, the method 100 can include concurrently displaying a view of the first application on a first user interface of the first computing device and the masked view of the first application on a second user interface of the second computing device in the collaborative session. The masked view can include a masked version of the view of the first application displayed on the first user interface of the first computing device.

In various embodiments, a user of the first application can control the concurrent display. For instance, the first user interface and/or other user interface of the first computing device (e.g., associated with a collaborative module on the first computing device) can display on indicator on a user interface of the first computing device. The indicator can include an icon, banner, and/or link, among other graphical indications.

For example, the indicator can contain an icon, button, and/or link with the text stating "You can share". The indicator can be displayed, for instance, when the user of the first computing device is interacting with an application that contains portions of a view of the application that are sharable with the user of the second computing device and/or when a collaborative session is established. In response to the user of the first computing device selecting the indicator, a masked view of the first application can be replicated. The view of the first application on the first user interface of the first computing device can be concurrently displayed with the masked view of the first application on the second user interface of the second computing device, for example.

In accordance with some embodiments of the present disclosure, a collaborative session with the first computing device and the second computing device can be established using a collaboration framework. A collaboration framework, in various instances, can include a wireless network, a physical network, and/or a portal. For instance, a request for the collaborative session can be routed from the second computing device to the first computing device using a wireless network and a physical network. Alternatively, a request for the collaborative session can be routed from the first computing device to the second computing device using a wireless network and a physical network.

For instance, a user using the first computing device (e.g., a customer), can make an indication within the portal to initiate a collaborative session. The indication can include selecting, clicking, and/or highlighting an icon, button and/or link on a user interface of a browser and/or application on the first computing device and/or interacting with a display of the first computing device.

In response to an indication from the user, the portal can send a request for a collaborative session to the second computing device over a network, for example. The network can, for instance, include a wireless network and/or the Internet. The request can be wirelessly transmitted using a wireless network, the Internet, and/or a physical network, in various embodiments (e.g., as discussed further herein).

Alternatively and/or in addition, the collaborative session can be initiated by the user of the second computing device selecting an icon, button and/or link (e.g., clicking a link on a browser and/or application on the second computing device) to chat and/or begin an instant message session. For example, in response to selecting an icon, button, and/or link, the chat and/or instant message session can be established that includes a collaborative session with the first computing device. That is, the user on the first computing device can discuss content using text, voice, and/or other sounds with the user on the second computing device, in addition to concurrently displaying a view of the first application on the first computing device and the masked view of the first application on the second computing device.

In accordance with some embodiments of the present disclosure, the first computing device (e.g., the device associated with the CSR) can query the second computing device to receive (e.g., collect) configuration information related to the second computing device. Configuration information, as used herein, can include device configuration data (e.g., device configuration data and/or second computing device configuration data). Device configuration data can include, but is not limited to, a unique identifier of the second computing device, the second computing device's hardware configuration, the network communication protocol being used, and/or a session number, among other data and/or information.

The configuration data can be stored for later use to re-establish a collaborative session if the connection with the second computing device is lost (e.g., terminated unintentionally, accidentally, and/or because of an error). The configuration data received from the second computing device can be queried in response to a received request for the collaborative session (e.g., from the first computing device and/or second computing device) and/or can be used to establish a collaborative session.

In various embodiments, the collaborative session can include emulating a browser session and/or application session. The emulation can be based on received application display data. For instance, the application display data can include first application display data. The application display data can be received over a network (e.g., wireless network), for example. Application display data can, for example, include data related to a current display of a session of an application (e.g., display data of the user interface as seen by a user on the first computing device).

The application display data can be sent, queried, and/or received in response to an established collaborative session, for instance.

In some embodiments of the present disclosure, the application display data can be used to emulate a session of the first application on the second computing device (e.g., in a browser user interface and/or second application user interface on the second computing device). Emulating a session of the first application, as used herein, can include graphically reproducing the first application display data as displayed on a first user interface of the first computing device on a second user interface and/or second display of the second computing device using the second application. Emulating a session of the first application can, for instance, be conducted within a collaborative session with the first computing device and the second computing device.

In some embodiments, the concurrently displayed data of the first application on a first user interface of the first computing device and on a second user interface of the second computing device can be displayed using the application display data in the collaborative session. The application display data from the first computing device can, for instance, be used to control the concurrent display of data of the masked view of the first application on the second user interface.

For instance, controlling concurrent display can include the first computing device controlling a revised concurrent display of the first application on the first user interface and the second user interface. In some embodiments, a collaborative module on the first computing device can use the application display data and device configuration data (e.g., associated with the first computing device) to control a revised concurrent display. A module can be a stand alone program or portion of a program or can be a set of code that provides a particular functionality and may not be stand alone and may not even include instructions interspersed within a set of code.

A revised concurrent display can include a new and/or revised user interface of the first application than the original application display data and/or the session, for example. Thereby, a user (e.g., first user, end-user, and/or CSR) associated with the first computing device can change and/or navigate the first application and the navigation of the first application can be concurrently displayed on the first user interface and the second user interface (e.g., a masked view).

In a number of embodiments of the present disclosure, the control of the concurrent display can be transferred to the second computing device (e.g., the user computing device). For instance, the transfer of control can include a transfer of control of the concurrent display of the masked view of the first application from the first computing device to the second computing device. For example, the control can be transferred to a second application on the second computing device. The user of the second computing device can, in response to the transfer of control, control a revised concurrent display of the first application, for instance.

Figure 2:
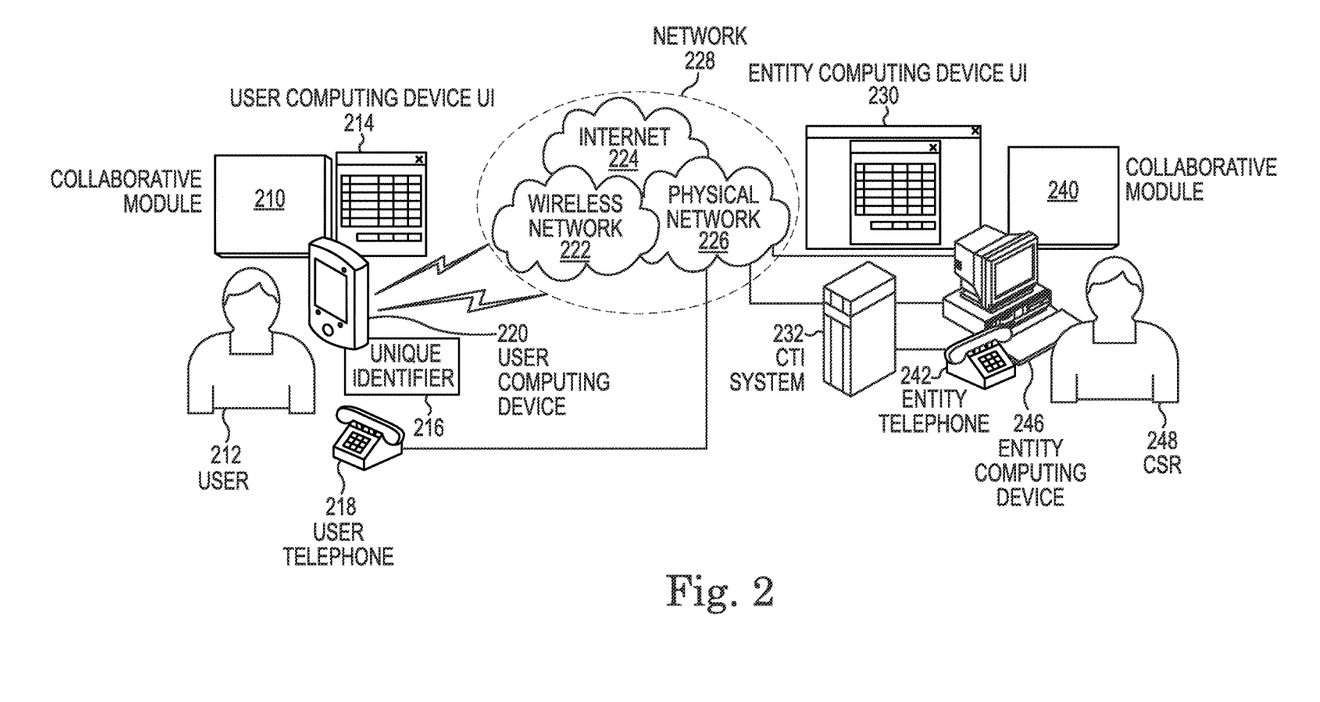
FIG. 2 illustrates an example environment for establishing a collaborative session according to one or more embodiments of the present disclosure.

FIG. 2 illustrates an example environment for establishing a collaborative session according to one or more embodiments of the present disclosure. The example environment illustrated in the embodiment of FIG. 2 can include, for instance, a collaboration framework (e.g., a framework to establish a collaborative session between two or more devices). The collaborative framework can include a portal utilized to establish the collaborative session between two or more devices (e.g., the user computing device 220 and the entity computing device 246).

A portal, as used herein, can include a web domain (e.g., a web site). For instance, a portal can include a start page with rich navigation, a collection of loosely integrated features, and a target audience. The portal can utilize a wireless network 222, the Internet 224, and/or a physical network 226, for example.

In some embodiments, the user computing device 220 and the entity computing device 246 can establish a collaborative session in response to the CSR 242 entering the portal and initiating the session by selecting an icon in the portal (e.g., "start a collaborative session"). For example, the CSR 242 can request a collaborative session through a link on a web page of the portal as displayed within an entity computing device user interface 230 on the entity computing device 246. The entity computing device user interface 230 can include a web browser user interface and/or an application user interface, for example.

Selecting the link can initiate the collaborative session request, which is wirelessly transmitted to a wireless access point of a wireless network 222, which is interconnected to the Internet 224, and a physical network 226. The Internet 224 can be accessed over a connection to either the physical network 226 or the wireless network 222.

As an example, a computing device may establish a wireless connection to wireless network 222. Once connected, the wireless device may access a web site on the Internet 224, which is hosted by a server connected to the Internet 224 through the physical network 226. Alternatively and/or in addition, the collaborative session can be initiated by the user 212 of the user computing device 220 selecting an icon, button, and/or link (e.g., clicking a link on a browser and/or application on the second computing device) to chat and/or begin an instant message session.

The wireless network 222, Internet 224, and/or physical network 226 can be sub-portions of a network 228. For instance, a network 228 can be heterogeneous. That is, the network 228 can be comprised of many different physical components, many of which typically comprise a protocol processor for the translation of the various communication protocols used by other components to support the interconnectivity and the exchange of information.

In some embodiments, the request from the CSR 248 can be received by a computer telephony (CTI) system 232 though a connection to the physical network 226. As used herein, a CTI refers to any combination of technologies and processes that enable or provide the integration and coordination of voice and data communications. The request can be routed by the CTI system 232 to the user computing device 220.

However, embodiments are not so limited. For example, in accordance with embodiments of the present disclosure, a variety of computer-readable instruction components and/or hardware components can be utilized to receive requests and/or establish a collaborative session (e.g., a broker, cloud system, internal and/or external service, and/or server, among other computing devices). As illustrated by the embodiment of FIG. 1, the entity computing device 246 can receive the request from the computer-readable instruction components and/or hardware components through a connection to the physical network 226 and/or the network 224 (e.g., a communication path).

In various embodiments, the user computing device 220 and the entity computing device 246 can include collaborative modules (e.g., 210, 240). The collaborative module 240 implemented on the entity computing device 246 can query a collaborative module 210 implemented on the user computing device 220 to collect information related to the user computing device 220. The information includes, but is not limited to, a unique identifier 216 of the user computing device 220, device hardware configurations, network communication protocol being used, and/or a session number.

The collaborative modules 210, 240 can include applications (e.g., native applications and/or web applications). In various embodiments, the collaborative module 210 implemented on the user computing device 220 can, for instance, be downloaded and/or retrieved. For instance, the collaborative module 210 implemented on the user computing device 220 can be downloaded from the portal.

The collected information can be stored for later use to re-establish a collaborative session if the connection with the user computing device 220 is lost. Once stored, the collected information is then used by the collaborative module 240 on the entity computing device 246 to establish a collaborative session with the collaborative module 210 on the user computing device 220.

In a number of embodiments, the entity computing device 246 can verify an identity of the user 212 prior to sending application display data. The user 212 can be verified, for example, by accessing customer information related to the user 212 on the user computing device 220 and/or using a unique identifier 216 associated with the user 212 and/or the user computing device 220.

Once a collaborative session is established, the collaborative module 240 on the entity computing device 246 can provide application display information to the collaborative module 210 on the user computing device 220 to control the concurrent display of a view of an application displayed on the user computing device user interface 214 and the entity computing device user interface 230. In some embodiments, the application display information can be used by the collaborative module 210 on the user computing device 220 to graphically reproduce the view of the application as it is displayed within the entity computing device user interface 230.

The view of the application on the user computing device user interface 214 can, for instance, include a masked view. The masked view can include a masked view of the view of the application displayed on the entity computing device user interface 230. A masked view, as used herein, can include of view of the application with a number of portions of the application limited, restricted, removed, replaced, and/or hidden (e.g., not displayed). For instance, a masked view can appear to the user 212 as if the view of the application has not been masked (e.g., appear as though no information has been limited, restricted, removed, replaced, and/or hidden).

The portions of the view of the application on the entity computing device 246 that are masked can be configured. For instance, the portions can be configured using tags.

As an example, the entity computing device 246 can include a plurality of applications. One or more of the applications can be running when the collaborative session is established. The CSR 248 can select a first application of the plurality of applications and can share a view of the first application utilizing the collaborative module 240 on the entity computing device 246.

In some embodiments, the first application may have information associated with a plurality of customers, including the user 212 of the user computing device 220. The masked view of the first application can include a view of the first application on the entity computing device 246 that is limited and/or restricted to information associated with the user 212. The information can, for instance, be associated with (e.g., embedded within the application) an unique identifier 216 of the user 212 and/or user computing device 220, which can be used to replicate the masked view that is limited and/or restricted to information associated with the user 212

In some embodiments, the user computing device 220 is in transit and a session identifier of the user computing device 220 and/or unique identifier 216 of the user 212 is used by the collaborative module 240 on the entity computing device 246 to maintain the collaborative session as the user 212 transitions from multiple wireless access points. If the user computing device 220 loses its connections, the collaborative module 210 on the user computing device 220 provides the unique identifier 216 to the collaborative module 240 on the entity computing device 246. The collaborative module 240 on the entity computing device 246 can utilize the unique identifier 216 to recover information stored in memory and/or to recover the state of the collaborative session when the connection was lost.

Figure 3A:
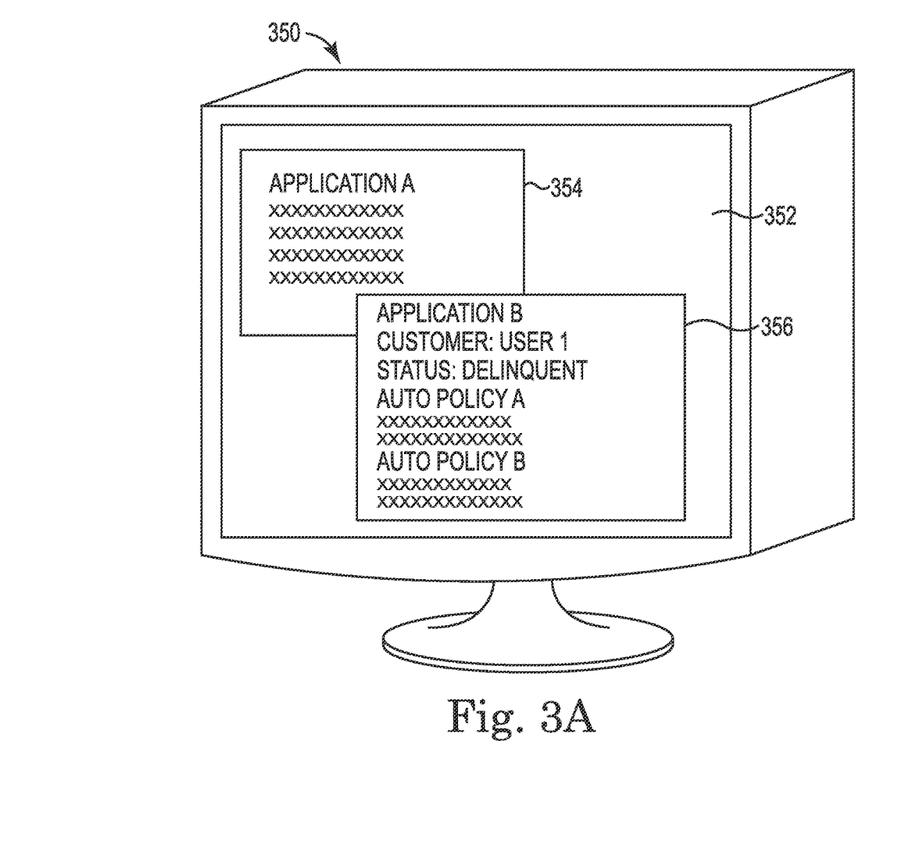
FIGS. 3A-3B illustrate an example of a first user interface of a first computing device and a second user interface of a second computing device during a collaborative session according to one or more embodiments of the present disclosure.
Figure 3B:
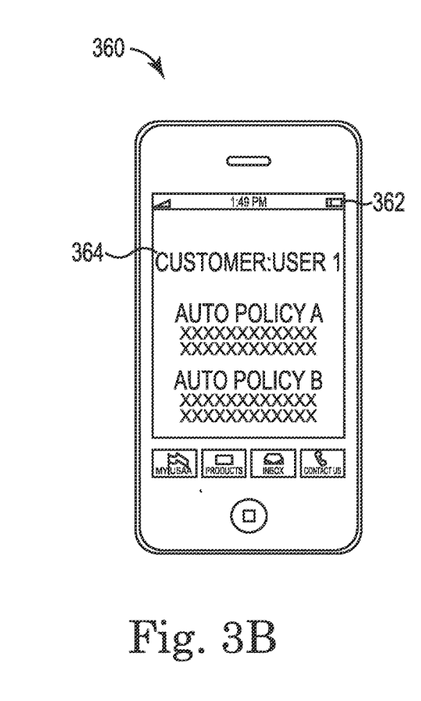

FIGS. 3A-3B illustrate an example of a first user interface of a first computing device and a second user interface of a second computing device during a collaborative session according to one or more embodiments of the present disclosure.

FIG. 3A illustrates an example a first user interface of a first computing device 350 during a collaborative session according to one or more embodiments of the present disclosure. The first computing device 350 can include an entity computing device. The first computing device 350, as shown in FIG. 3A, can include a stationary device.

As shown in FIG. 3A, a first computing device 350 can include a first display 352. For instance, a first display 352 can be used to display a first user interface of a first application 356 on the first computing device 350 during a collaborative session. A display, as used herein, can include a screen and/or a touch screen, for example.

As illustrated by FIG. 3A, a user of the first computing device 350 can have a plurality of applications running at a particular time (e.g., the user interface of the first application 356 and the user interface of a second application 354). When a collaborative session is established, a user of the first computing device 350 (e.g., a CSR) can select a particular application (e.g., first application 356) and can replicate a masked view of the first application on the first computing device 350 based on configured tags of the first application.

The masked view of the first application (e.g., masked view of the user interface of the first application 356) can be sent to a second computing device (e.g., second computing device 360 illustrated in FIG. 3B). In various embodiments, a collaborative module of the first computing device 350 can be used to select an application, replicate a masked view, and/or send the replicated masked view to a second computing device.

In some embodiments of the present disclosure, the first computing device 350 (e.g., a collaborative module on the first computing device 350) can provide an indication that the first computing device 350 is in an established collaborative session. For example, the first user interface of the first application 356 on the first computing device 350 can include an indication that the first computing device 350 is in the established collaborative session (e.g., not illustrated in FIG. 3A). Such indication can, for instance, include a banner and/or text stating a collaborative session is occurring and/or a name of a user on the second computing device (e.g., 360 of FIG. 3B) that is in a collaborative session with the first computing device 350.

In one or more embodiments of the present disclosure, the first display 352 of the first computing device 350 can include an icon, button, and/or link that a user can select, click, and/or highlight to disconnect from the collaborative session. The icon, button, and/or link can be a "Disconnect" icon, in some embodiments, within the first user interface of the first application 356.

For instance, in response to a user indication (e.g. selecting, clicking, and/or highlighting the "Disconnect" icon), an established collaborative session can end and/or terminate. The user can include a first user and/or CSR associated with the first computing device 350. Thereby, the first computing device 350 (e.g., an application and/or collaborative module on the first computing device 350) can be operable to disconnect the collaborative session in response to an indication from a user on and/or associated with the first computing device 350.

FIG. 3B illustrates an example a second user interface of a second computing device 360 during a collaborative session according to one or more embodiments of the present disclosure. The second computing device 360 can include a user computing device.

As shown in FIG. 3B, a second computing device 360 can include a mobile device. For instance, a second computing device 360 can include a body of a mobile device and a second display 362. Although not illustrated by the embodiment of FIG. 3B, the second computing device 360 in various embodiments can include a television (e.g., a television with wireless and/or wired communication and/or the ability to connect to the Internet).

A second display 362 can be used to display a second user interface of a first application 364 on the second computing device 360. The second user interface of the first application 364 on the second computing device 360 can include a concurrent display of the first user interface of the first application on the first computing device (e.g., the first user interface of the first application 356 on the first computing device 350 in FIG. 3A) that is masked. For example, a second user interface of the first application 364 on the second computing device 360 can include a graphical reproduction of the first interface of the first application 356 on the first computing device 350 that is masked.

In some embodiments, the second computing device 360 (e.g., a collaborative module on the second computing device 360) can provide an indication that the second computing device 360 is in an established collaborative session. For example, the second user interface of the first application 364 on the second computing device 360 can include an indication that the second computing device 360 is in the established collaborative session (e.g., not illustrated in FIG. 3B). Such indication can, for instance, include a banner and/or text stating a collaborative session is occurring and/or a name of a user on the first computing device (e.g., 350 of FIG. 3A) that is in a collaborative session with the second computing device 360.

In one or more embodiments, a second user interface of the first application 364 on the second display 362 during an established collaborative session can include an icon, button, and/or link that a user can select, click, and/or highlight to disconnect from the collaborative session. The icon, button, and/or link can include a "Disconnect" icon. A "Disconnect" icon can be on one or more user interfaces associated with the first application, for example.

For instance, in response to a user indication, an established collaborative session can end and/or terminate. User indication can, for example, include selecting, clicking, and/or highlighting the "Disconnect" icon. The user can include a second user associated with the second computing device 360. Thereby, the second computing device 360 (e.g., an application and/or collaborative module on the second computing device 360) can be operable to disconnect the collaborative session in response to an indication from a user on and/or associated with the second computing device 360.

As illustrated by the embodiment of FIG. 3B, the view of the first application can be masked. For instance, the second user interface of the first application 364 on the second display 362 of the second computing device 360 can be masked. For example, the first computing device 350 illustrated in FIG. 3A can replicate a masked view of the first application based on configured tags of the first application.

As illustrated by the embodiment of FIG. 3A-3B, a masked view of the first application can include limitation, restriction, removal, replacement, and/or hiding (e.g., not displaying) of portions of the view of the first application. For example, the first user interface of the first application 356 on the first computing device 350 illustrates the application name and status of the customer of "delinquent". The second user interface of the first application 364 on the second computing device 360 has the application name and status of the customer of "delinquent" removed. That is, the data is masked.

In some embodiments, the first user interface of the first application 356 of the first computing device 350 can display the masked view of the first application (e.g., not illustrated by FIG. 3A). The masked view can be displayed on the first computing device 350, for instance, in response to a user selecting an icon, button, and/or link (e.g., "show customer's view") in the first user interface of the first application 356 on the first computing device 350 to display the same view as displayed on the second computing device 360. In such embodiments, the first user interface of the first application 356 on the first computing device 350 can display the same user interface of the first application as displayed on the second computing device 360. This can be used to avoid accidental disclosure of information that is intended to be masked (e.g., prevent and/or minimize the risk of a CSR disclosing masked information).

In some embodiments, although not illustrated by the embodiment of FIG. 3A, the view displayed on the first computing device 350 can include a visual indication of portions of the view of the first application that are masked on the second user interface. For instance, the masked portions can be highlighted, crossed-through, and/or bolded, among other visual indications.

Alternatively and/or in addition, the concurrent display can include displaying an un-masked view of the first application on the first user interface. As illustrated by FIG. 3A, the first user interface of the first application 356 of the first computing device 350 can display an un-masked view of the first application.

Figure 4:
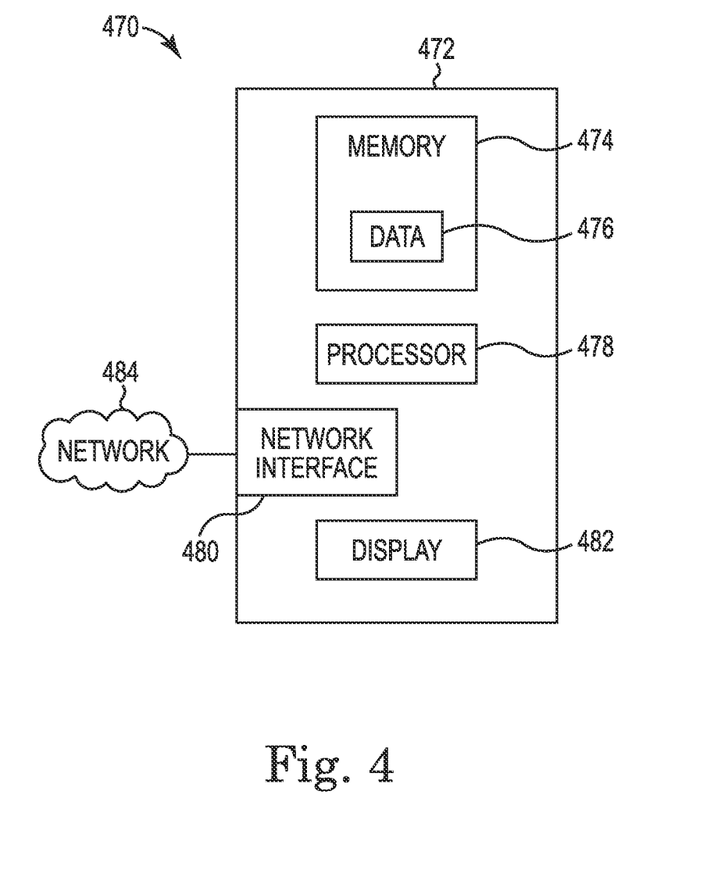
FIG. 4 illustrates a block diagram of an example of a computing system according to one or more embodiments of the present disclosure.

FIG. 4 illustrates a block diagram of an example of a computing system 470 according to one or more embodiments of the present disclosure. The computing system 470 can be utilized with one or more embodiments of the present disclosure. The computing system 470 can include a computing device 472 (e.g., an entity computing device 246 illustrated in FIG. 2 and/or first computing device 350 illustrated in FIG. 3A). The computing device 472 can be, for example, a laptop computer and/or a desktop computer, among other types of computing devices.

The computing device 472 can include a memory 474 and a processor 478 coupled to memory 474. For example, the memory 474 can include various types of information including data 476 and executable instructions, as discussed herein. Memory 474 can be any type of storage medium that can be accessed by processor 478 to perform various examples of the present disclosure (e.g., establish a collaborative session with a user computing device in response to a request from the entity computing device within the portal, etc.) For example, memory 474 can be a non-transitory computing device readable medium having computing device readable instructions (e.g., computing device program instructions, machine readable instructions, computer readable instructions, etc.) and data 476 stored thereon. The computing device readable instructions are executable by processor 478 to perform various examples of the present disclosure. The data 476 can be used (e.g., analyzed by) the computing device readable instructions during their execution.

Memory 474 can be volatile or nonvolatile memory. Memory 474 can also be removable (e.g., portable) memory, or non-removable (e.g., internal) memory. For example, memory 474 can be random access memory (RAM) (e.g., dynamic random access memory (DRAM) and/or phase change random access memory (PCRAM), read-only memory (ROM) (e.g., electrically erasable programmable read-only memory (EEPROM) and/or compact-disc read-only memory (CD-ROM), flash memory, a laser disc, a digital versatile disc (DVD) or other optical disk storage, and/or a magnetic medium such as magnetic cassettes, tapes, or disks, among other types of memory.

Further, although memory 474 is illustrated as being located in computing device 472, embodiments of the present disclosure are not so limited. For example, memory 474 can, in addition to or alternatively, be located internal to another computing resource (e.g., enabling computer readable instructions to be downloaded over the Internet or another wired or wireless connection). For instance, the memory 474 can include memory stored on a cloud network.

The computing device 472 can include a network interface 480. Network interface 480 can connect the computing device 472 to a network, such as network 484 illustrated in FIG. 4.

Network 484 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 484) can provide a communication system that directly or indirectly links two or more computers and/or peripheral devices and allows users to access resources on other computing resources (e.g., computing devices and/or data storage devices) and/or exchange messages with other users.

A network can allow users to share resources on their own systems with other network users and to access information on centrally located systems or on systems that are located at remote locations. For example, network 484 can tie a number of computing devices together to form a distributed control network (e.g., permit a computing device to connect to a repository of multimedia files hosted and/or uploaded to a central server by other computing devices accessing the network).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network. For instance, the network 484 can be used to connect and/or communicate between devices and/or applications of a system, such as illustrated in the embodiment of FIG. 2.

The computing device 472 can also include a display 482. Display 482 can include, for example, a screen that can provide (e.g., display and/or present) information to a user of computing device 472.

Additionally, computing device 472 can receive information from the user of computing device 472 through an interaction with the user via display 482. For example, computing device 472 can receive input from the user via display 482 (e.g., a touch screen display or via another user input device such as a keyboard in response to interaction with items show on the display). For example, the user can enter the input into computing device 472 using, for instance, a mouse and/or keyboard associated with computing device 472 (e.g., display 482). For instance, a user can enter input to cause the computing device 472 to replicate a masked view of the first application. The masked view can, for example, be shown on the display 482.

In one or more embodiments, the processor 478, in association with memory 474, can be associated with data 476 and/or application modules (e.g., not shown in FIG. 4). The processor 478, in association with the memory 474, can store and/or utilize data and/or execute instructions to control concurrent display of an application between two devices in an established collaborative session.

As used herein, a module can be a stand alone program or portion of a program or can be a set of code that provides a particular functionality and may not be stand alone and may not even include instructions interspersed within a set of code. Such application modules can include collaborative session module, mask view module, concurrent display module, and/or revise display module. In various embodiments, the modules as discussed herein, can include sub-modules of a collaborative module on the entity computing device.

A collaborative session module can, for example, be configured to establish a collaborative session with a user computing device in response to a request from the entity computing device within a collaboration framework (e.g., a wireless network, physical network, and/or portal). In various instances, the collaborative session module can receive device configuration data from a collaborative module on the user computing device. For instance, the collaborative session module can query the user computing device to receive device configuration data in response to a request (e.g., initiation) of a collaborative session within the collaboration framework, such as a portal.

A mask view module can be configured to replicate a masked view of a first application on the entity computing device based on tags of the first application. The tags can be configured by the entity, for instance. The masked view of the first application, in some embodiments, can include a screen shot, editable document of a screen shot, and/or an editable screen shot of the first application.

In various embodiments, the views of the first application can be saved. For instance, the view can be saved by a user on the entity computing device and/or the masked view can be saved by a user on the user computing device. The saved view can be used, for example, by a CSR and/or user to document product, service, and/or policy discussions with a user and/or CSR for future reference and/or use.

A concurrent display module can, for example, be configured to control concurrent display of a view of the first application on the first user interface of the entity computing device and a masked view of the first application on a second user interface of the user computing device in the collaborative session. The concurrent display can include a graphical reproduction of the replicated masked view of the first application on user computing device concurrently while displaying the view of the first application on the entity computing device. The masked view can, for instance, include masking of the view of the first application currently displayed on the first user interface of the entity computing device.

In some embodiments, the concurrent display module can further be configured to verify an identity of a user associated with the user computing device prior to concurrently displaying the masked view of the first application. The user can be verified, for example, by accessing customer information related to the user on the user computing device and/or using a unique identifier associated with the user (e.g., a unique identifier of the customer).

A revise display module can be configured to concurrently revise the display of the view of the first application on the first user interface with the masked view of the second user interface using the entity computing device. For example, a display can be revised by a user of the entity computing device navigating the first application. The navigation can change the view of the first application and can be concurrently displayed. In various instances, a collaborative module on the entity computing device can control the concurrent display and revised display of the view and masked view of the first application.

In accordance with some embodiments of the present disclosure, a transfer control module can be configured to transfer control of the concurrent display of the view and masked view of the first application from the entity computing device to the user computing device. For example, the transfer can be to a second application (e.g., a collaboration module) on the user computing device. In response to the transfer, the user on the user computing device can control the concurrent display of the view of the first application and the masked view of the first application. For instance, the entity computing device (e.g., a collaboration module) can receive revised application display data from the user computing device and use the revised application display data to display a revised view of the first application (e.g., that is also displayed on the user computing device).

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense. As used herein, "a" or "a number of" used in referring to a particular thing is intended refer to one or more such things.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, if provided, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, inventive subject matter lies in less than all features of a single disclosed embodiment. Thus, the claims, if provided, are hereby incorporated into the Detailed Description, with each claim standing on its own as a separate embodiment.

What is claimed:

1. A computing device implemented method for concurrent display of a masked view of an application, comprising:
   receiving a request from a first computing device for establishing a collaborative session between the first computing device and a second computing device;
   receiving a user identifier associated with a user of the second computing device;
   establishing a collaborative session between the first computing device and the second computing device at least partially based on the user identifier;
   providing a view of a first application for display on the first computing device;
   determining a portion of the view of the first application displayed on the first computing device based on the user identifier, the portion of the view comprising information associated with the user identifier;
   providing a masked view of the first application on the first computing device, the masked view comprising the portion of the view; and
   concurrently displaying the view of the first application on a first user interface of the first computing device and the masked view of the first application on a second user interface of the second computing device in the collaborative session;
   wherein the view of the first application comprises information associated with the user and information associated with one or more other users, and the masked view of the first application is absent the information associated with the one or more other users.

2. The computing device implemented method of claim 1, wherein establishing the collaborative session includes initiating the collaborative session using a collaboration framework.

3. The computing device implemented method of claim 1, wherein providing the masked view of the first application includes generating an editable document of a snap shot of the view of the first application.

4. The computing device implemented method of claim 1, including configuring a number of portions of the first application that are sharable.

5. The computing device implemented method of claim 4, wherein providing the masked view of the first application includes automatically replicating the configured number of portions of the first application.

6. The computing device implemented method of claim 1, wherein concurrently displaying includes:

displaying the view of the first application on the first user interface with a visual indication of portions of the view of the first application that are masked on the second user interface; and displaying the masked view of the first application on the second user interface.

7. The computing device implemented method of claim 1, wherein providing the masked view includes:

limiting information of the view of the first application to information associated with a user of the second computing device to replicate the masked view.

8. The computer implemented method of claim 1, wherein concurrently displaying includes controlling a revised concurrent display of the first application on the first user interface and the masked view of the first application on the second user interface using the first application.

9. A non-transitory computer-readable medium having computer-readable instructions stored thereon and executed by a processor to:

receive a request from an entity computing device for establishing a collaborative session between the entity computing device and a user computing device;

receive a user identifier associated with a user of the user computing device;

establish a collaborative session between the user computing device and the entity computing device at least partially based on the user identifier;

provide a view of a first application for display on the entity computing device;

determine a portion of the view of the first application displayed on the entity computing device based on the user identifier, the portion of the view comprising information associated with the user identifier;

provide a masked view of the first application on the entity computing device, the masked view comprising the portion of the view; and control concurrent display of the view of the first application on a first user interface of the entity computing device and the masked view of the first application on a second user interface of the user computing device in the collaborative session;

wherein the view of the first application comprises information associated with the user and information associated with one or more other users, and the masked view of the first application is absent the information associated with the one or more other users.

10. The medium of claim 9, further comprising instructions executed to receive an electronic signature associated with the masked view of the first application on the second user interface of the user computing device at the entity computing device in the collaboration session.

11. The medium of claim 9, further comprising instructions executed to send a request to initiate the collaborative session to the user computing device within the collaboration framework.

12. The medium of claim 9, further comprising instructions executed to emulate a session of the first application of the entity computing device from received application display data in the collaborative session.

13. The medium of claim 9, further comprising instructions executed to disconnect the collaborative session in response to at least one of an indication from a user associated with the entity computing device and an indication from a user associated with the user computing device.

14. The medium of claim 9, further comprising instructions executed to transfer control of the concurrent display of the masked view of the first application from the entity computing device to the user computing device.

15. A system for controlling concurrent display of a masked view of an application, comprising:

a memory having computer-readable instructions stored thereon; and a processor coupled to the memory and configured to execute the computer-readable instructions to:

receive a request from an entity computing device for establishing a collaborative session between the entity computing device and a user computing device;

receive a user identifier associated with a user of the user computing device;

establish a collaborative session between the user computing device and the entity computing device at least partially based on the user identifier;

provide a view of a first application for display on the entity computing device;

determine a portion of the view of the first application displayed on the entity computing device based on the user identifier, the portion of the view comprising information associated with the user identifier;

provide a masked view of the first application on the entity computing device, the masked view comprising the portion of the view;

control concurrent display of the view of the first application on a first user interface of the entity computing device and the masked view of the first application on a second user interface of the user computing device in the collaborative session; and concurrently revise the display of the view of the first application on the first user interface and the masked view of the first application on the second user interface using the entity computing device;

wherein the view of the first application comprises information associated with the user and information associated with one or more other users, and the masked view of the first application is absent the information associated with the one or more other users.

16. The system of claim 15, wherein the system further includes a collaborative module to control the concurrent display and the revised display of the view and the masked view of the first application.

17. The system of claim 16, wherein the processor is configured to execute computer-readable instructions to navigate the first application and the navigation is concurrently displayed.

18. The system of claim 15, wherein the processor is configured to execute computer-readable instructions to verify an identity of a user associated with the user computing device prior to controlling the display of the masked view of the first application.

19. The system of claim 15, wherein device configuration data associated with the user computing device and received at the entity computing device includes a user identifier.

* * * * *

UNITED STATES PATENT AND TRADEMARK OFFICE
CERTIFICATE OF CORRECTION

| | |
|---|---|
| PATENT NO. | : 9,602,560 B1 |
| APPLICATION NO. | : 14/102169 |
| DATED | : March 21, 2017 |
| INVENTOR(S) | : Mark W. Moody et al. |

It is certified that error appears in the above-identified patent and that said Letters Patent is hereby corrected as shown below:

In the Claims

Column 18, Line 61, Claim 19, after "includes" delete "a".

Signed and Sealed this
Eighth Day of August, 2017

Joseph Matal
*Performing the Functions and Duties of the*
*Under Secretary of Commerce for Intellectual Property and*
*Director of the United States Patent and Trademark Office*